United States Patent [19]

Park

[11] Patent Number: 5,011,443

[45] Date of Patent: Apr. 30, 1991

[54] CLEANING OF FLAT GLASS CRT FACEPLATE WITH INTERNAL ANTI-GLARE SURFACE

[75] Inventor: Yong S. Park, South Barrington, Ill.

[73] Assignee: Zenith Electronics Corporation, Glenview, Ill.

[21] Appl. No.: 460,043

[22] Filed: Jan. 2, 1990

[51] Int. Cl.$^5$ .............................................. H01J 9/50
[52] U.S. Cl. ........................................... 445/2; 134/7
[58] Field of Search ................. 445/2; 134/7

[56] References Cited

U.S. PATENT DOCUMENTS

| | | | |
|---|---|---|---|
| 2,710,286 | 6/1955 | Zachariason | 134/7 X |
| 4,655,957 | 4/1987 | Chromecek et al. | 134/7 X |
| 4,666,465 | 5/1987 | Matsumoto et al. | 134/7 X |
| 4,839,082 | 6/1989 | Bhatia | 134/7 X |

OTHER PUBLICATIONS

TRINCO Catalog No. 22 of Trinity Tool Company of Fraser, Michigan, apparently published Sep., 1989.

Primary Examiner—Kenneth J. Ramsey

[57] ABSTRACT

In recovering flat glass faceplates used in color cathode ray tubes (CRTs) where the CRT is rejected during manufacture, the faceplate is cleaned for re-use with a high pressure vapor blast incorporation small particles in a slurry form. The particles may be comprised of small plastic beads or pellets, with walnut shells reduced to particle size on the order of 40-100 mesh and pressures in the range of 20-30 p.s.i. used in a preferred embodiment.

10 Claims, 2 Drawing Sheets

CLEANING OF FLAT GLASS CRT FACEPLATE WITH INTERNAL ANTI-GLARE SURFACE

BACKGROUND OF THE INVENTION

This invention relates generally to the manufacture of color cathode ray tubes (CRTs) and is particularly directed to the recovery of flat glass faceplates in CRTs rejected during the manufacturing process for re-use.

A conventional CRT consists of an evacuated envelope having a neck portion, a glass faceplate, and a funnel portion therebetween. An electron gun disposed in the neck portion of the envelope emits energetic electrons which are directed onto the inner surface of the faceplate. Disposed on the inner surface of the faceplate are a large number of phosphor elements which glow momentarily when struck from the rear by electrons from the electron gun to produce a video image which is visible through the faceplate. Also disposed on the inner surface of the faceplate is a layer of a black, light-absorbing material in the form of a matrix which defines the phosphor dots. A metalized layer typically including aluminum is also frequently disposed on the CRT's inner surface to reflect the light produced by the electron-excited phosphor elements outward toward the viewer for enhanced video image brightness.

A CRT is particularly susceptible to the effects of ambient light incident upon its faceplate. Ambient light produces reflections from both the outer, or forward, surface of the CRT's faceplate as well as from its inner, or aft, surface. In the past, the surfaces of the CRT's faceplate have typically been roughened to a given surface texture either by pressing the glass surface, called stippling; by using a chemical process such as acid etching; or have been covered with a layer of anti-reflection coating to reduce reflections directed back toward the viewer which degrade the video image. The pressing and acid etching approaches roughen the surfaces of the faceplate so as to reduce specular reflection from the faceplate and increase its diffuse reflection. The layers of anti-reflection coating deposited on the faceplate's surfaces possess interference properties selected so as to minimize ambient light reflection from its forward and aft surfaces toward the viewer.

Recent developments in CRT technology have lead to the use of flat glass faceplates in color CRTs. These flat glass faceplates have attached to the inner surface thereof a flat tension mask (FTM) which is affixed to a support structure and is maintained in a tightly stretched condition. The FTM is in the form of a thin metal foil having a large number of very small apertures through which the electron beams are directed to permit the FTM to serve as a color selection electrode, or parallax barrier. The FTM support structure may be comprised of metal or a ceramic material and is affixed to the inner surface of the faceplate and attached to the FTM by means of a frit-based cement or by welding, depending upon the support structure composition.

The etched inner surface of the flat glass faceplate has a carefully controlled degree of roughness in order to minimize internal reflections without degrading video image acuity. The degree of roughness is generally expressed as a depression value range, with a roughness range of 10-20 microns root mean square (RMS) depression value range providing optimum video image acuity and minimum internal specular reflection.

During manufacture, the CRT undergoes numerous tests at various stages of assembly. This rigorous testing is intended to ensure that the product sold is of high quality and reliability. However, this demanding test schedule inevitably results in the rejection of CRTs at various stages of assembly. Because of the high cost of some CRT components, it is cost effective to salvage and re-use acceptable components of otherwise rejected CRT. One CRT component which is particularly desirable to salvage and re-use because of its relative cost and because it does not generally contribute to the rejection of the CRT is the flat glass faceplate. Before the flat glass faceplate can be re-installed in another CRT during assembly, it must be restored to its original condition, followed by the application of the various layers of video image producing and enhancing materials on its inner surface. This means that the glass faceplate must be separated from the CRT funnel; the FTM and its support structure must be removed from the glass faceplate; and the phosphor coating, black surround, and aluminized layer must be removed from the faceplate's inner surface.

Prior art approaches for cleaning the flat glass faceplate of a rejected CRT for re-use involve the application of pressurized water with a micro-soap and hot caustic solution to the faceplate. This approach has been of limited use because of the incomplete removal of the aluminized, phosphor and black matrix layers. Incomplete removal of any portion of any of the aforementioned layers from the inner surface of the faceplate renders the faceplate unacceptable for re-installation in a CRT. Acid etching employing hydrofluoric etching acid such as used in initial roughening of the faceplate's surface has proven to be effective in removing the aforementioned materials, but leads to additional etching of the glass surface. This additional etching increases the roughness, or texture, of the glass faceplate rendering it unacceptable for video image transmission.

The present invention addresses and overcomes the aforementioned limitations of the prior art by providing a method for cleaning the roughened inner surface of a flat glass faceplate used in a color CRT. By directing a vapor blast containing small particles or pellets onto the faceplate's inner surface, the various video image producing and enhancing materials disposed on the faceplate are removed. A preferred embodiment contemplates vapor blasting at a pressure on the order of 20-30 p.s.i. with a slurry of ground up walnut shells in water.

OBJECTS OF THE INVENTION

Accordingly, it is an object of the present invention to allow for recovery and re-use of flat glass faceplates in color CRTs rejected during manufacture.

It is another object of the present invention to provide an inexpensive and effective method for salvaging the flat glass faceplate of a rejected color CRT for re-use.

Still another object of the present invention is to facilitate removal of various materials from the inner antiglare surface of a flat glass faceplate in a rejected color CRT without damaging the faceplate to permit its re-use in another CRT.

A further object of the present invention is to avoid discarding and allow for re-use of the flat glass faceplate of a color CRT rejected during manufacture in reducing CRT production costs.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, in which:

DESCRIPTION OF THE PREFERRED EMBODIMENT

Figure 1:
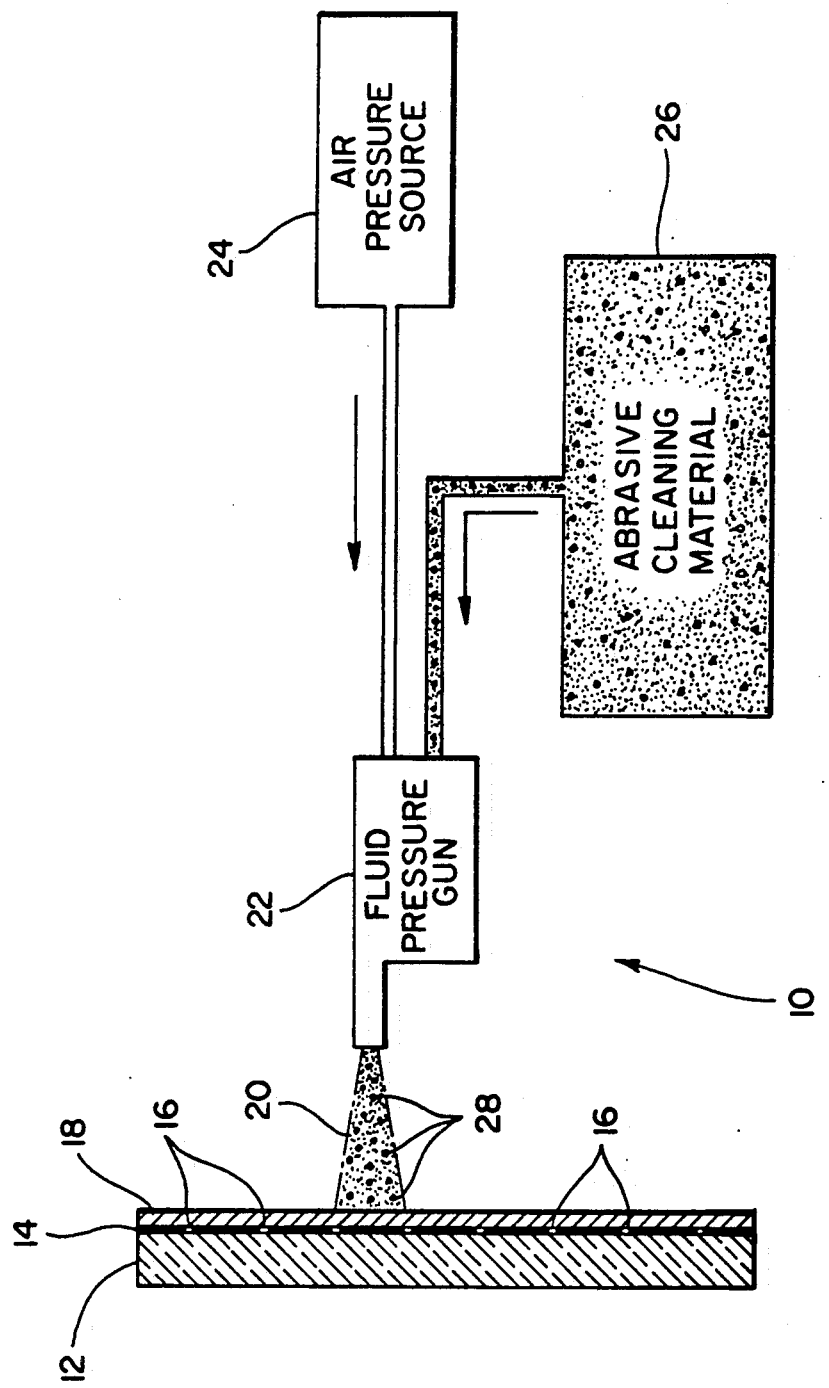
FIG. 1 is a simplified schematic and block diagram of apparatus for vapor blasting a CRT faceplate with small particles or pellets in accordance with the present invention.

Referring to FIG. 1, there is shown in simplified schematic and block diagram form a system 10 for cleaning the inner surface of a flat glass faceplate 12 for re-use in the assembly and manufacture of color CRTs. The flat glass faceplate 12 is adapted for mounting to the forward edge of a funnel (not shown) in forming a CRT bulb. Disposed on a first, inner surface of the flat glass faceplate 12 are a plurality of spaced phosphor elements 14 disposed over apertures in a black surround graphite layer 16 and a thin metal oxide reflective layer 18. The phosphor elements 14 are in the form of individual phosphor dots disposed over spaced apertures in the black surround layer 16 and on the inner surface of the glass faceplate 12. The thin metal oxide reflective layer 18 permits transmission of the electrons to the phosphor dots and reflects the light output by the phosphor elements which glow momentarily when struck from the rear by electrons from the CRT's electron guns to produce a video image which is visible through the glass faceplate 12.

The outer surface of the flat glass faceplate 12 is roughened somewhat to reduce external reflections on the faceplate which interfere with the video image transmitted by the faceplate. Similarly, as previously described, the inner surface of the flat glass faceplate 12 is also roughened to reduce internal reflections from the faceplate which also interfere with and make viewing of the video image more difficult.

The faceplate cleaning system 10 includes a fluid pressure gun 22 coupled to an air pressure source 24 and a reservoir of abrasive cleaning material 26. The air pressure source 24 may be conventional in design and operation, such as a well known air compressor. The air pressure source 24 delivers air under pressure to the fluid pressure gun 22 which also may be conventional in design and operation and which is adapted for combining an air blast from the air pressure source 24 with the fluid abrasive cleaning material 26 for directing a high pressure vapor in the form of a slurry 20 onto the inner surface of the flat glass faceplate 12.

The abrasive cleaning material 26 is comprised of small particles, or pellets, 28 in a relatively inert fluid such as water. The particles are preferably on the order of 40-100 mesh in size. In a preferred embodiment, the slurry 20 is directed onto the glass faceplate 12 at a pressure on the order of 20-30 p.s.i. and at a distance of 4-5 inches. The small particles 28 in the slurry 20 may be comprised of plastic or glass beads, corn cobs or fruit stones reduced to appropriate particle size, or small walnut shell particles as in a preferred embodiment. It has been found that a slurry directed upon the flat glass faceplate 12 at the indicated pressure range and incorporating the specified types of particles with the indicated size range rapidly and effectively removes the phosphor elements 14, the black surround layer 16, and the metal oxide layer 18 from the roughened inner surface of the flat glass faceplate 12 without affecting the roughness of the faceplate. With the flat glass faceplate 12 thus cleaned of the various layered materials deposited thereon, the faceplate may then be re-used in another CRT bulb as described below and illustrated in FIG. 2.

Figure 2:
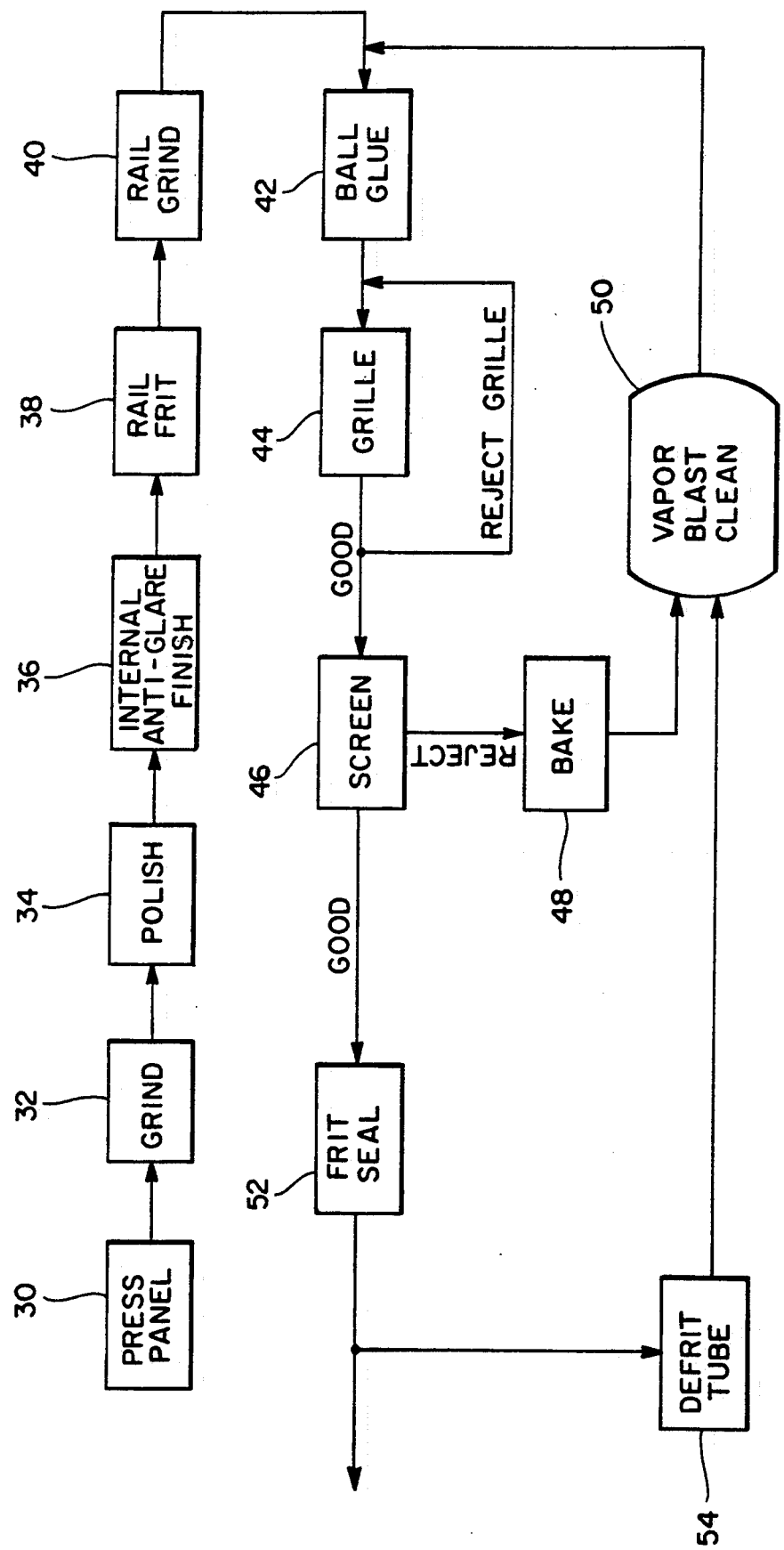
FIG. 2 is a flow chart illustrating the various steps in the assembly of a CRT employing the faceplate cleaning method of the present invention to permit re-use of a faceplate in a rejected CRT.

Referring to FIG. 2, there is shown a flow chart in block diagram form illustrating the steps involved in the fabrication of a flat glass panel, its incorporation in a color CRT during manufacturing, followed by rejection of the CRT and cleaning of its glass faceplate in accordance with the present invention for subsequent use in another CRT bulb. The process begins at step 30 with the formation of the flat glass faceplate. The flat glass faceplate is typically formed in a press mold which includes a hollow mold into which a glass gob is deposited. The inner and outer surfaces of the glass faceplate are ground at step 32 to a flat finish and to a designated thickness, followed by polishing of both facing surfaces to a predetermined smoothness. At step 36, an internal anti-glare (IAG) finish is applied to the inner surface of the flat glass faceplate by various methods such as pressing the glass surface in a process referred to as stippling, grinding the inner surface of the faceplate to a predetermined roughness typically on the order of a depression value range of 10-20 microns root mean square (RMS), or acid etching of the faceplate's inner surface using a solution of hydrofluoric acid. At step 38, a flat tension mask (FTM) support rail is securely attached to the faceplate's inner surface such as by means of a frit-based cement. The FTM support rail may be comprised of a high strength metal or ceramic material which is ground down at step 40 to provide a predetermined FTM support rail thickness. This predetermined FTM support rail thickness establishes the distance of the FTM from the faceplate's inner surface, commonly referred to as the Q-distance. The Q-distance is precisely specified for a given color CRT geometry to ensure proper positioning of the three electron beams incident upon the phosphor elements on the glass faceplate's inner surface.

At step 42, the edges of the flat glass faceplate are glued to reference elements typically in the shape of balls which are then used for aligning and proper positioning of the glass faceplate with a CRT funnel and other CRT components. Examples of such a ball-and-groove alignment system can be found in U.S. Pat. No. 4,828,523, assigned to the assignee of the present application. At step 44, the black surround matrix, or grille, is deposited on the inner surface of the glass faceplate. The black surround matrix is provided with a plurality of spaced apertures therein. The alignment and spacing of the black surround matrix is then tested to ensure proper spacing of the apertures therein as well as the thickness thereof. Once the spacing and thickness of the black surround matrix is verified, phosphor is deposited at step 46 over each of the apertures in the black surround matrix. Following step 44, if imperfections are found in the black surround matrix, corrective action is taken to place the glass faceplate in acceptable condition for mating with a CRT funnel.

Various tests are performed on the phosphor dot-black surround matrix arrangement following the screening procedure of step 46. If imperfections in the phosphor screening are uncovered, the glass faceplate is rejected. A rejected flat glass faceplate is first baked at high temperatures at step 48 in order to loosen the layers of phosphor and black surround. The rejected glass faceplate is then subjected to the vapor blast cleaning of the present invention at step 50 to thoroughly remove all deposits from its inner surface and place it in condition for re-use in another CRT. In some instances, the high temperature baking cycle at step 48 is not necessary and the deposited layers on the inner surface of the glass faceplate may be removed by the vapor blast cleaning of step 50 in accordance with the present invention.

After the application of the phosphor screen to the black surround matrix, the flat glass faceplate is mated to a CRT funnel in a sealed manner. A frit-based cement is commonly used to form the vacuum tight seal between the flat glass faceplate and a forward edge of the funnel. Additional tests are then performed on the CRT bulb formed of the flat glass faceplate and funnel. These tests include the checking of the vacuum seal, verifying proper positioning and alignment of the FTM and phosphor screen on the inner surface of the flat glass faceplate, and other CRT performance tests. If the assembled CRT bulb fails any of these tests, the bulb is rejected and is subjected to a defritting process at step 54. Defritting of the assembled CRT bulb involves removal of the frit seals between the flat glass faceplate and FTM mounting rail and funnel. With the flat glass faceplate separated from the funnel and the FTM and its support rail removed from the faceplate, the various layers deposited on the inner surface of the faceplate are removed by the vapor blast cleaning method of the present invention at step 50 permitting the glass faceplate to be re-used in the manufacture of another color CRT.

There has thus been shown a method for reclaiming flat glass faceplates in the manufacture of color CRTs. Following rejection of a flat glass faceplate or the CRT in which it is installed, the inner surface of the faceplate is subjected to a high pressure vapor blast for removing various layers of video image producing and enhancing materials. The vapor blast cleaning involves directing the combination of a high pressure vapor and small particles onto the faceplate's inner surface for cleaning the faceplate without modifying its internal antiglare finish and permitting its re-use in another CRT.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. For use in re-using a flat glass faceplate in a color cathode ray tube (CRT) rejected during assembly, wherein the flat glass faceplate includes a textured anti-glare finish as well as a plurality of layered video image producing and enhancing materials disposed on an inner surface thereof, a method for removing said layered materials and cleaning the inner surface of the flat glass faceplate comprising the steps of:

combining a gas under pressure with a solution containing small insoluble particles in forming a slurry; and directing the slurry under pressure onto the inner surface of the flat glass faceplate for removing the layered materials therefrom without changing the texture of the anti-glare finish.

2. The method of claim 1 wherein the small particles in the solution are in the range of 40-100 mesh in size.

3. The method of claim 1 wherein the step of directing the slurry onto the inner surface of the flat glass faceplate includes directing the slurry at a pressure on the order of 20-30 p.s.i.

4. The method of claim 3 wherein the slurry is directed onto the inner surface of the flat glass faceplate from a distance in the range of 4-5 inches.

5. The method of claim 4 wherein the particles are formed from crushed walnut shells.

6. The method of claim 4 wherein the particles are glass beads.

7. The method of claim 4 wherein the particles are plastic beads.

8. The method of claim 4 wherein the particles are formed from crushed fruit stones.

9. The method of claim 4 wherein the particles are formed from reduced corn cobs.

10. The method of claim 1 further comprising the step of baking the flat glass faceplate at an elevated temperature prior to directing the slurry onto the inner surface thereof.

* * * * *